United States Patent [19]

Mitchell

[11] Patent Number: 5,378,075
[45] Date of Patent: Jan. 3, 1995

[54] LOCKING MECHANISM FOR STOCK RESTRAINING EQUIPMENT

[75] Inventor: Henry E. Mitchell, Timaru, New Zealand

[73] Assignee: Prattley Engineering Limited, Temuka, New Zealand

[21] Appl. No.: 70,044

[22] Filed: Jun. 1, 1993

[30] Foreign Application Priority Data

Jun. 2, 1992 [NZ] New Zealand .................. 242978

[51] Int. Cl.⁶ .............................................. F16G 11/00
[52] U.S. Cl. ..................................... 403/314; 403/300
[58] Field of Search ........................ 403/300, 309, 314

[56] References Cited

U.S. PATENT DOCUMENTS

| | | | |
|---|---|---|---|
| 3,103,375 | 9/1963 | McMullin | 403/300 |
| 4,216,568 | 8/1980 | Anderson | 403/314 |
| 4,531,478 | 7/1985 | Forrest . | |
| 4,534,317 | 8/1985 | Walsh . | |
| 4,822,203 | 4/1989 | Walmsley | 403/314 |
| 5,149,145 | 9/1992 | Facey et al. | 403/314 |

FOREIGN PATENT DOCUMENTS 2188690 10/1987 United Kingdom ................ 403/300

OTHER PUBLICATIONS

Abstracts of Great Britain patent publications 1579393, 2023397, 2080088, 2141914.

*Primary Examiner*—John T. Kwon
*Attorney, Agent, or Firm*—Cushman Darby Cushman

[57] ABSTRACT

A locking mechanism (2) for stock restraining equipment, for locking a bar (3) in position at any position along a major length of the bar (3), mechanism (2) including a housing (7) to form a tapered passage (11), a roller (6) in the passage arranged to bear against the side of the bar (3), the bar (3), passage (11) and roller (6) being arranged so that the roller (6) can move along the passage between a lock position and a release position, along with a lever for moving the roller (6) between the lock position and the release position.

8 Claims, 2 Drawing Sheets

LOCKING MECHANISM FOR STOCK RESTRAINING EQUIPMENT

BACKGROUND OF THE INVENTION

1. Field of the Invention

The present invention relates to a locking mechanism capable of locking a bar in position at any position along a major part of its length. The locking mechanism of the present invention could be used in a number of different applications, but has been devised with special reference to the problems of locking stock restraining equipment, especially cattle crushes and cattle head-bails, and will be described in relation to these applications.

2. Description of the Prior Art

Stock restraining equipment has to be extremely robust and quick and easy to use if the animal is not restrained rapidly in the correct position it will struggle and may injure itself and bystanders. Hitherto, locking mechanisms for such equipment have been of a ratchet type, but this is noisy in operation, is susceptible to slipping if the ratchet teeth become worn, and can lock only in a series of discrete positions i.e. where the ratchet teeth are in mesh with the carrier.

BRIEF SUMMARY OF THE INVENTION

It is therefore an object of the present invention to provide a locking mechanism for stock restraining equipment which is required to operate and is not susceptible to slippage. It is a further object of the invention to provide a locking mechanism for stock restraining equipment where it is not necessary that the only locking position is a series of discrete positions.

The present invention provides: a locking mechanism for locking a bar in position at any position along a major part of the length of the bar, said mechanism comprising:

a bar;

a housing which includes walls inclined together to form a tapered passage through which the bar passes, with the longitudinal axis being substantially parallel to that of the bar;

a roller located in said passage and arranged to bear against the side of the bar, with the longitudinal axis of the roller perpendicular to that of the bar, said roller being capable of rotation about its longitudinal axis and of movement along the length of the passage;

said bar, passage and roller being arranged and dimensioned such that the roller can move along the passage between a "lock" position in which the roller lies adjacent the narrow end of the passage and bears hard against the side of the passage and the side of the bar, and locks the bar against movement in a predetermined direction, and a "release" position in which the roller lies adjacent the wider end of the passage and is in light rolling contact with the bar and the bar can move freely relative to the housing;

and means for moving said roller from the "lock" position to the "release" position.

Preferably a pair of rollers, one on each side of the bar, are used.

Preferably also, the rollers are biassed towards the 'lock' position.

The rollers may be mounted in channels formed in the interior of the housing, but preferably are mounted in separate plates lying with the housing.

BRIEF DESCRIPTION OF THE DRAWINGS

A preferred embodiment of the invention is described in detail, with reference to the accompanying drawings, in which.

DETAILED DESCRIPTION OF PREFERRED EMBODIMENT OF THE INVENTION

Figure 1:
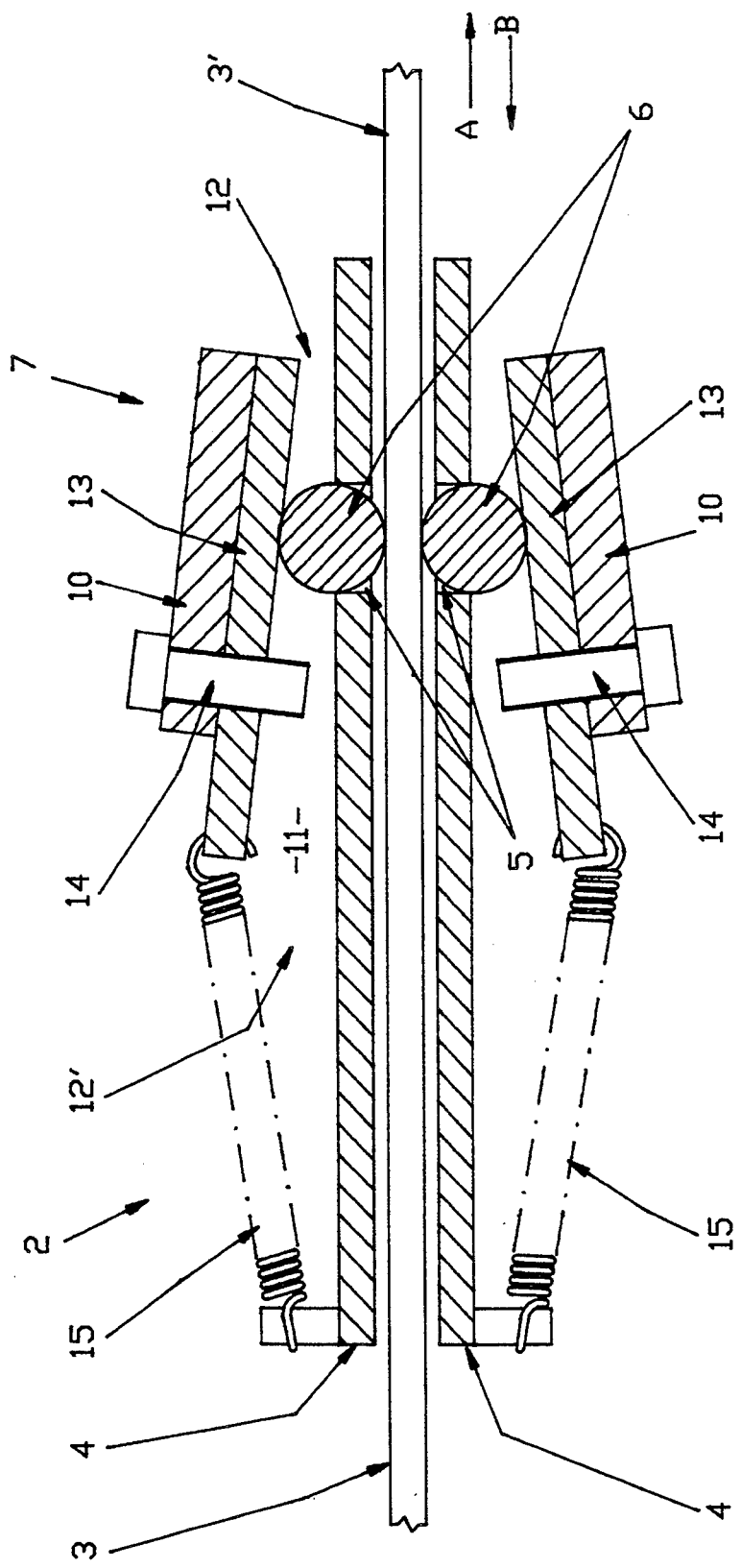
FIG. 1 is a horizontal section through a mechanism in accordance with the present through a mechanism in accordance with the present invention.

Referring to the drawings, locking mechanism 2 comprises a flat-sided bar 3 (only part of which is shown) which slides in the directions of arrows A & B to respectively widen and narrow the aperture of the crush or head bail (not shown) with which the bar is associated.

The bar 3 passes between a pair of parallel plates 4 formed with a pair of aligned apertures 5. A roller 6 lies in each aperture 5, and the aperture is dimensioned to allow the roller 6 to rotate freely about its longitudinal axis.

The portion of the plates 4 which includes the apertures 5 lies within a housing 7 which consists of parallel top and bottom plates 8, 9, and a pair of side plates 10 rigidly secured between said top and bottom plates 8, 9, and inclined towards each other to form a passage 11 through the housing which is narrower at one end 12 than at the other end 12'.

The width of the passage 11 is such that when the plates 4 and rollers 6 are positioned with the rollers 6 at or adjacent the mid-point of the length of the housing, the rollers 6 are pushed towards each other by the inner surfaces of the side plates 10, so that the rollers 6 are pressed tightly against the sides of the bar 3, locking the bar 3 rigidly to the housing.

The length of the plates 4 is such that when the rollers 6 lock the bar 3, the plates 4 extend from each end of the housing at the wider end 12' of the housing, the projecting ends of the plates are connected to biassing springs 15 which extend between the ends of the plates and the housing, and bias the plates 4 in the direction of arrow A, urging the plates 4 and rollers 6 towards the narrower end 12 of the passage 11.

At the narrower end 12 of the housing, the plates 4 project by a distance equal to or greater than the distance between the position of the plates 4 at which the rollers 6 lock the bar 3 and the position at which the passage 11 is of sufficient width to allow the rollers to rotate freely relative to the bar 3, and the bar 3 to slide freely in the housing.

Figure 2:
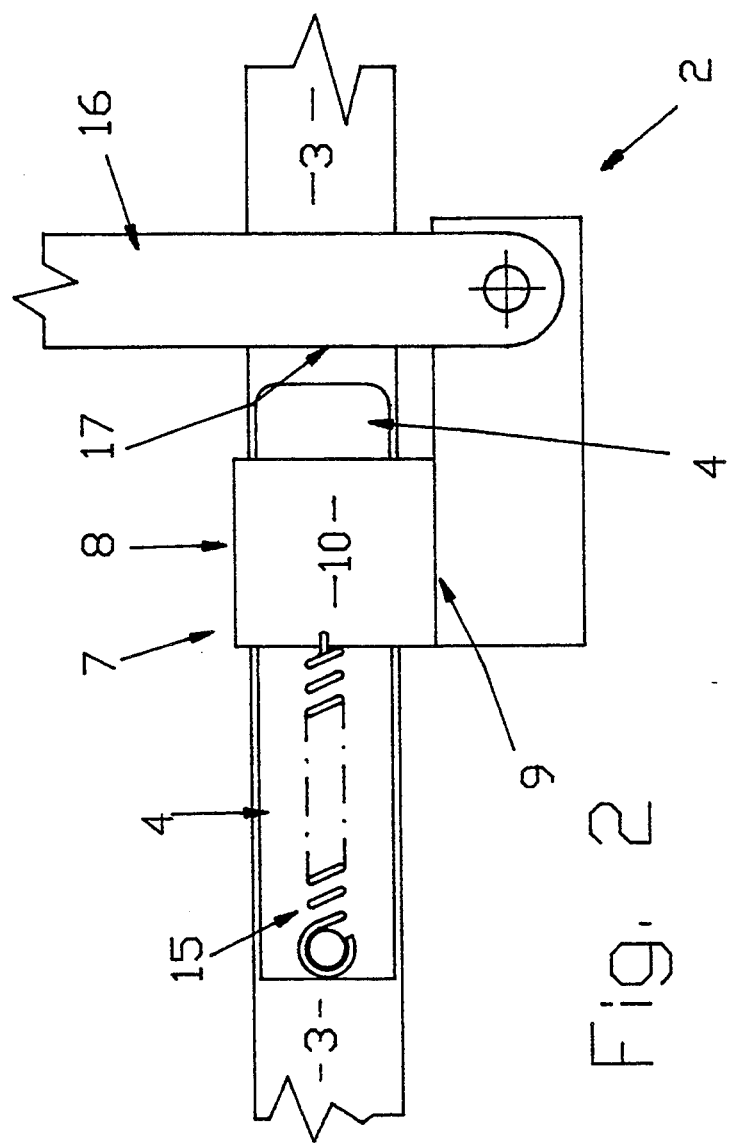
FIG. 2 is a side view of the mechanism of FIG. 1, on a reduced scale.

Thus, when the plates 4 are in the 'lock' position of FIG. 1, and the bar 3 is locked by the rollers 6, the bar 3 is released to slide freely in the housing by pivoting a split lever 16 (FIG. 2 only) until the surface 17 of lever 16 pushes the projecting ends of the plates 4 in the direction of arrow B, moving the plates 4 and rollers 6 along inside the housing until the rollers 6 reach a 'release' position in the housing where the passage is sufficiently wide to allow the rollers to rotate freely and hence the bar 3 to slide freely.

The inner surface of each side plate 10 is formed by a replaceable wear plate 13 which is secured to the major portion of the corresponding side by a bolt 14 which also serves as a retaining bolt for the corresponding roller 6.

The above-described mechanism is used as follows the bar 3 is mounted in known manner, with its free end 3' secured to one side of the restraining equipment and the housing 7 secured to the other side of the restraining equipment, so that the length of the bar 3 between the two sides of the restraining equipment limits the degree of said equipment opening.

To adjust the equipment opening freely, the lever 16 is raised to push the plates 4 and rollers 6 to the 'release' position, and the bar 3 is slid through the housing to the required position. The lever 16 is then lowered, allowing the springs 15 to bias the rollers 6 to the 'lock' position. In this position, the bar 3 can move only in direction of arrow B—movement of the bar 3 in this direction pushes the rollers 6 towards the wider part of the passageway 11, and reduces the grip of the rollers 6 on the bar, allowing the bar to slide between the rollers. Movement of the bar in the direction of arrow A is prevented by the pressure of the rollers 6 on the sides of the bar 3. Thus, the restraining device can be tightened manually by pushing the bar in the direction of arrow B, but the restraining device can not be opened until the lever 16 is used.

I claim:

1. A locking mechanism for locking a bar in position at any position along a major part of the length of the bar, said mechanism comprising:

a bar;

a housing which includes walls inclined together to form a tapered passage through which the bar passes, with the longitudinal axis being substantially parallel to that of the bar;

at least one roller located in said passage and arranged to bear against the side of the bar, with the longitudinal axis of the roller perpendicular to that of the bar, said roller being capable of rotation about its longitudinal axis and of movement along the length of the passage;

said bar, passage and roller being arranged and dimensioned such that the roller can move along the passage between a lock position in which the roller lies adjacent the narrow end of the passage and bears hard against the side of the passage and the side of the bar, and locks the bar against movement in a predetermined direction, and a release position in which the roller lies adjacent the wider end of the passage and is in light rolling contact with the bar and the bar can move freely relative to the housing;

and means for moving said roller from the lock position to the release position.

2. The mechanism as claimed in claim 1 including a second roller and the at least one roller and second roller comprise a pair of rollers arranged one on each side of the bar.

3. The mechanism as claimed in claim 1 wherein said mechanism is biassed towards the lock position.

4. The mechanism as claimed in claim 2 wherein said mechanism is biassed towards the lock position.

5. The mechanism as claimed in claim 2 including a pair of plates wherein each said roller is mounted for movement relative to said passage within an aperture in a respective one of said plates each of which lies at least partly within said passage and is movable relative to the longitudinal axis of said passage.

6. The mechanism as claimed in claim 2 wherein said mechanism is biassed towards the lock position.

7. The mechanism as claimed in claim 5 wherein said means for moving said rollers from the lock position to the release position comprises a lever pivotally mounted upon the housing and pivotable to a position in which said lever bears against said plates so as to push said plates, and hence the rollers associated with the plates, to said release position.

8. The mechanism as claimed in claim 5 including a pair of tension springs and wherein said mechanism is biassed to said lock position by said tension springs connected respectively between said plates and the housing, so as to bias said rollers towards the narrow end of said passage.

* * * * *

UNITED STATES PATENT AND TRADEMARK OFFICE
CERTIFICATE OF CORRECTION

PATENT NO. : 5,378,075

DATED : January 3, 1995

INVENTOR(S) : Henry E. Mitchell

It is certified that error appears in the above-identified patent and that said Letters Patent is hereby corrected as shown below:

Column 1, line 18, after "use" insert -- :- --.

Column 2, line 44, after "housing" (1st. occ.) insert--:--.

Column 3, line 4, after "follows" insert -- : --

Column 3, line 18, change "B--" and insert -- B:- --     .

Signed and Sealed this

Twenty-second Day of August, 1995

Attest:

BRUCE LEHMAN

Attesting Officer      *Commissioner of Patents and Trademarks*